(12) United States Patent
Lee et al.

(10) Patent No.: US 8,497,333 B2
(45) Date of Patent: Jul. 30, 2013

(54) POLYLACTIC ACID COMPOSITION FOR AUTOMOBILE PARTS

(75) Inventors: Choon Soo Lee, Gyeonggi-do (KR); Min Hee Lee, Gyeonggi-do (KR); Bong Hyun Park, Gyeonggi-do (KR); Jong Hwal Kim, Daegu (KR); Sung Kyoun Yoon, Gyeonggi-do (KR); Byoung Gook Kang, Gyeonggi-do (KR); Keun Kyu Lee, Daejon (KR); Jong Lee, Seoul (KR)

(73) Assignees: Hyundai Motor Company, Seoul (KR); Hyosung Corporation, Seoul (KR); Desco Co., Ltd., Chilgok-Gun, Gyeongsangbuk-Do (KR)

( * ) Notice: Subject to any disclaimer, the term of this patent is extended or adjusted under 35 U.S.C. 154(b) by 0 days.

(21) Appl. No.: 13/295,378

(22) Filed: Nov. 14, 2011

(65) Prior Publication Data

US 2013/0066015 A1   Mar. 14, 2013

(30) Foreign Application Priority Data

Sep. 9, 2011 (KR) .......................... 10-2011-0092198

(51) Int. Cl.
*C08F 34/02* (2006.01)
*C08F 16/34* (2006.01)
*C08F 118/02* (2006.01)
*C08F 36/00* (2006.01)

(52) U.S. Cl.
USPC ............ 526/271; 526/315; 526/319; 526/335

(58) Field of Classification Search
USPC .................... 526/271, 315, 319, 335
See application file for complete search history.

(56) References Cited

U.S. PATENT DOCUMENTS

2009/0065730 A1 *   3/2009   Yoshino et al. .............. 252/62.2

FOREIGN PATENT DOCUMENTS

| JP | 11210461 A | 8/1999 |
|----|---|---|
| JP | 2007211206 A | 8/2007 |
| JP | 2010215703 A | 9/2010 |
| KR | 1020090093957 | 9/2009 |
| KR | 10-2011-0078381 | 7/2011 |

* cited by examiner

*Primary Examiner* — William Cheung
(74) *Attorney, Agent, or Firm* — Edwards Wildman Palmer LLP; Peter F. Corless

(57) ABSTRACT

Disclosed is a polylactic acid composition with improved heat-resistance and improved impact-resistance. Specifically, in the disclosed polylactic acid composition, both impact strength and heat-resistance are improved by mixing 30 to 80 wt % of polyketone and 10 to 40 wt % of modified rubber. The disclosed polylactic acid composition does not only exhibit excellent in heat resistance, chemical resistance, fuel permeation resistance, abrasion resistance, etc., but also has improved impact-resistance and improved heat resistance. Thus, it is possible to employ polylactic acid as a bioplastic in interior/exterior parts of a vehicle.

9 Claims, 1 Drawing Sheet

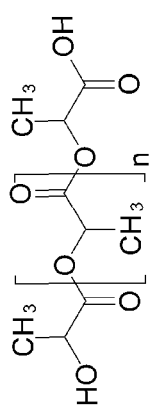
[ polylactic acid ]
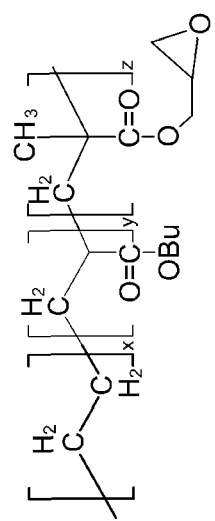
[ rubber with a glycidyl group ]
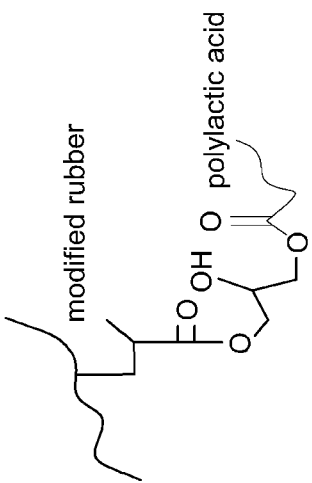
modified rubber
polylactic acid

POLYLACTIC ACID COMPOSITION FOR AUTOMOBILE PARTS

CROSS-REFERENCE TO RELATED APPLICATION

This application claims under 35 U.S.C. §119(a) the benefit of Korean Patent Application No. 10-2011-0092198 filed on Sep. 9, 2011, the entire contents of which are incorporated herein by reference.

BACKGROUND (a) Technical Field

The present invention relates to a polylactic acid composition with improved heat-resistance and improved impact-resistance. More particularly, the present invention relates to a polylactic acid composition in which both impact strength and heat-resistance are improved by a mixture of polyketone with modified rubber.

(b) Background Art

Polylactic acid is a polymer made by synthesis of lactic acid as a monomer, in which the lactic acid is obtained by fermentation of starch, etc. extracted from corn, etc. as a renewable resource. When the polylactic acid is applied to interior/exterior parts of a vehicle, the heat resistance, impact resistance, and hydrolysis resistance of the polylactic acid must be improved.

Polyketone is a terpolymer obtained by polymerization of carbon monoxide, ethylene, and propylene as monomers, which requires cheaper raw materials and a polymerization process to make, when compared to general engineering plastic materials such as polyamide, polyester, and polycarbonate. Also, polyketone is known to have excellent heat resistance, chemical resistance, fuel permeation resistance, abrasion resistance, etc.

A conventional polymer material requiring petroleum resources as a raw material increases carbon dioxide concentration in the air when incinerated after its use. However, even though polylactic acid emits carbon dioxide through incineration or biodegradation, the emitted carbon dioxide originated from the air. Thus, the polylactic acid is a genuinely recyclable material which does not increase carbon dioxide concentration in the air since the carbon dioxide which is emitted originally came from the air.

Polylactic acid, however, is weak in impact resistance strength. Accordingly, in order to use the polylactic acid as structural materials such as car interior/exterior materials, research for overcoming its weakness through stiffeners such as natural fibers has been conducted (T. Inho and Y. Kageyama, SAE 2004-01-0730). In some automobile companies, a polylactic/natural fiber composite has been applied to parts such as a spare tire well cover. However, the composite has a disadvantage in that it is hydrolyzed by moisture absorption, resulting in a drop in its physical properties.

Also, in order to improve the heat resistance of polylactic acid, much research for blending the polylactic acid with polycarbonate, acrylonitrile butadiene styrene (ABS), polyethylene terephthalate (PET), polypropylene, etc. has been conducted. However, significant effects have not been obtained yet.

SUMMARY OF THE DISCLOSURE

The present invention provides a polylactic acid composition suitable for automobile parts, in which both heat-resistance and impact-resistance of the polylactic acid composition are effectively improved. In one aspect, the present invention provides a polylactic acid composition including 10 to 50 wt % of polylactic acid, 30 to 80 wt % of polyketone, and 10 to 40 wt % of modified rubber.

The inventive polylactic acid composition does not only exhibit excellent chemical resistance, fuel permeation resistance, abrasion resistance, etc., but also has improved impact resistance and improved heat resistance. Thus, it is possible to employ polylactic acid as a to bioplastic in interior/exterior parts of a vehicle. Further, it is expected that the application of the polylactic acid can be extended into the field of environmentally-friendly materials.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a view schematically showing a chemical bonding reaction between polylactic acid and modified rubber, according to one exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the to invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of all engine and motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, the present invention will be described in more detail.

The present invention has been made in an effort to improve the weak physical properties (such as heat resistance, impact resistance, hydrolysis resistance) of polylactic acid. The inventive composition is prepared by compounding polylactic acid with polyketone and modified rubber, and more particularly, by mixing and compounding 10 to 50 wt % of polylactic acid, with 30 to 80 wt % of polyketone and 10 to 40 wt % of modified rubber. Herein, the mixing of polyketone and modified rubber can improve both heat resistance and impact resistance.

In the present invention, polylactic acid is preferably included in a range of 10 to 50 wt %. When polylactic acid is included in an amount of less than 10 wt %, the composition is unusable as a bioplastic due to its low content of polylactic acid within the composition. On the other hand, when polylactic acid is included in an amount of greater than 50 wt %, the solidification rate of the material within an injection mold is too slow, thereby lowering productivity of the production line.

Also, in the present invention, polyketone is preferably included in a range of 30 to 80 wt %. When polyketone is included in an amount of less than 30 wt %, only an insignificant effect on heat resistance, and thus the heat resistance is not improved. On the other hand, when polyketone is included in an amount greater than 80 wt %, the composition is unusable as a bioplastic due to its low content of polylactic acid within the composition.

Also, in the present invention, modified rubber is preferably included in a range of 10 to 40 wt %. When modified rubber is included in an amount less than 10 wt %, only an insignificant effect on impact resistance is achieved. On the other hand, when modified rubber is included in an amount of greater than 40 wt %, bonds between modified rubbers, other than the bonds between the modified rubber and the polylactic acid, are increased. In this case, an impact-modifying effect in proportion to the amount of input modified rubber cannot be achieved, and also the products flexural modulus is lowered.

As shown in FIG. 1, the polylactic acid is chemically bonded to modified rubber. Herein, a chemical bond may partially occur between modified rubbers, but this bond has no effect on impact modification of the polylactic acid composition. In the present invention, the modified rubber is preferably maleic anhydride-modified rubber or glycidyl group-modified rubber. Examples of the maleic anhydride-modified rubber may include MA-g-EPR, MA-g-EOR, MA-g-EPDM, MA-g-SEBS, MA-g-SEPS, ethylene-n-butyl acrylate-maleic anhydride, etc., and examples of the glycidyl group-modified rubber may include ethylene-n-butyl acrylate-glycidyl methacrylate, ethylene/glycidyl methaacrylate/vinyl acetate, etc. [MA: maleic anhydride, EPR: ethylene propylene rubber, EOR: ethylene octene rubber, EPDM: ethylene propylene diene Monomer (M-class) rubber, SEBS: styrene-ethylene/butylene-styrene SEPS: styrene-ethylene/propylene-styrene]

The polylactic acid composition according to the present invention is excellent in heat resistance and impact resistance as well as its general mechanical property, and thus is suitable for automobile parts such as a center fascia, a console cover, a door handle or a tailgate garnish.

EXAMPLES

The following examples illustrate the invention and are not intended to limit the same.

Examples 1 to 3 and Comparative Examples 1 to 4

According to the compositions noted in Table 1, raw materials were mixed and melt-blended by a co-rotating twin-screw extruder at 230° C., and palletized. Then, the palletized materials were injection-molded at 235° C. so as to provide a test sample. The test sample prepared as described above was used to test properties in accordance with test methods below, and the obtained results are noted in Table 1.

(1) flexural modulus, flexural strength: the measurement was carried out according to ASTM D 790 at a room temperature, the size of the test piece was 127×12.7×6.4 mm, and the test speed was 10 mm/min.

(2) tensile strength: the measurement was carried out according to ASTM D 638, the test piece was Type 1, and the test speed was 50 mm/min.

(3) IZOD impact strength: the measurement was carried out according to ASTM D 256, at a room temperature and at a low temperature (−30° C.), by using a notched test piece with a size of 63.5×12.7×6.4 mm.

(4) HDT: the test was carried out according to ASTM-D648, under a condition of 4.6 kg/cm$^2$/.

TABLE 1

| | mixing weight ratio | | | flexural modulus (MPa) | flexural strength (MPa) | HDT ( ) | IZOD impact strength Room temperature (J/m) |
|---|---|---|---|---|---|---|---|
| | poly-ketone | polylactic acid | modified rubber | | | | |
| Comp. Ex. 1 | 100 | 0 | 0 | 1979 | 68 | 206 | 70 |
| Comp. Ex. 2 | 0 | 100 | 0 | 3529 | 118 | 55 | 28 |
| Comp. Ex. 3 | 65 | 35 | 0 | 2430 | 80 | 180 | 25 |
| Comp. Ex. 4 | 61 | 33 | 6 | 2400 | 78 | 175 | 20 |
| Ex. 1 | 58 | 31 | 11 | 2310 | 71 | 170 | 38 |
| Ex. 2 | 52 | 29 | 19 | 2190 | 65 | 160 | 47 |
| Ex. 3 | 48 | 26 | 26 | 1990 | 62 | 152 | 60 |

As seen in the above Examples and Comparative Examples, the composition of the present invention containing the mixture of polylactic acid/polyketone/modified rubber showed a high mechanical property similar to that of polyketone alone (Comparative Example 1). Meanwhile, the heat resistance and the impact resistance strength of the composition were significantly improved compared to those in the case of the use of polylactic acid alone (Comparative Example 2). Also, the impact strength was significantly improved compared to when modified rubber was not used (Comparative 3) or when modified rubber was used in a small amount (Comparative Example 4).

The inventive polylactic acid composition is not only excellent in chemical resistance, fuel permeation resistance, abrasion resistance, etc., but also has improved impact resistance and improved heat resistance. Thus, it is possible to employ polylactic acid as a bioplastic in interior/exterior parts of a vehicle. Further, it is expected that the application of the polylactic acid can be extended into the field of environmentally-friendly materials.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polylactic acid composition comprising 10 to 50 wt % of polylactic acid, 30 to 80 wt % of polyketone, and 10 to 40 wt % of modified rubber.

2. The polylactic acid composition of claim 1, wherein the polyketone is a polyketone homopolymer or an alloy of polyketone and modified rubber.

3. The polylactic acid composition of claim 1, wherein the modified rubber is maleic anhydride-modified rubber or glycidyl group-modified rubber.

4. The polylactic acid composition of claim 1, wherein the composition is used for automobile parts.

5. The polylactic acid composition of claim 4, wherein the automobile parts comprise a center fascia, a console cover, a door handle or a tailgate garnish.

6. A vehicle part composed of:
a polylactic acid composition including 10 to 50 wt % of polylactic acid, 30 to 80 wt % of polyketone, and 10 to 40 wt % of modified rubber.

7. The vehicle part of claim 6, wherein the polyketone is a polyketone homopolymer or an alloy of polyketone and modified rubber.

8. The vehicle part of claim 6, wherein the modified rubber is maleic anhydride-modified rubber or glycidyl group-modified rubber.

9. The vehicle part of claim 6, wherein the vehicle part is at least one vehicle part selected from a group consisting of a center fascia, a console cover, a door handle or a tailgate garnish.

* * * * *